US010225342B2

(12) United States Patent
Gong

(10) Patent No.: US 10,225,342 B2
(45) Date of Patent: Mar. 5, 2019

(54) SYSTEM AND METHOD FOR GENERATING CONVERGED VIEWS OF A VIRTUAL COMPUTING ENVIRONMENT

(71) Applicant: VCE Company, LLC, Richardson, TX (US)

(72) Inventor: Changbin Gong, Sherborn, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 384 days.

(21) Appl. No.: 14/175,445

(22) Filed: Feb. 7, 2014

(65) Prior Publication Data
US 2015/0229722 A1 Aug. 13, 2015

(51) Int. Cl.
G06F 15/16 (2006.01)
H04L 29/08 (2006.01)
G06F 9/445 (2018.01)
G06F 9/455 (2018.01)

(52) U.S. Cl.
CPC .......... H04L 67/1097 (2013.01); G06F 9/445 (2013.01); G06F 9/45558 (2013.01); H04L 67/36 (2013.01); G06F 2009/45591 (2013.01)

(58) Field of Classification Search
CPC ............................ H04L 67/1097; H04L 67/34
USPC ........................................................ 709/206
See application file for complete search history.

(56) References Cited

U.S. PATENT DOCUMENTS

| 6,112,015 A * | 8/2000 | Planas ...................... H04L 41/22 709/220 |
| 2002/0095479 A1 * | 7/2002 | Schmidt ............ G06F 17/30235 709/218 |
| 2005/0120160 A1 * | 6/2005 | Plouffe ............... G06F 9/45537 711/1 |
| 2011/0125894 A1 | 5/2011 | Alcalde et al. |
| 2012/0005344 A1 * | 1/2012 | Kolin ................. H05K 7/20836 709/226 |
| 2012/0137235 A1 | 5/2012 | T S et al. |
| 2013/0055091 A1 * | 2/2013 | Dutta ..................... G06F 9/5077 715/736 |
| 2012/3485924 | 4/2013 | Halfeng et al. |
| 2013/0212576 A1 * | 8/2013 | Huang ................. G06F 9/45558 718/1 |
| 2014/0019966 A1 * | 1/2014 | Neuse ................. G06F 9/45533 718/1 |

(Continued)

OTHER PUBLICATIONS

International Search Report and Written Opinion regarding PCT/US2015/013579, dated May 11, 2015.

Primary Examiner — Hamza N Algibhah
(74) Attorney, Agent, or Firm — Polsinelli PC

(57) ABSTRACT

A converged infrastructure management system includes a processing system and a memory for storing an operations management application, which is executed by the processing system to obtain physical configuration information associated with one or more physical hosts of a virtual computing environment, and virtual object information associated with a plurality of virtual objects executed on the hosts. Using this information, the application generates an association for each virtual object, the association associating the virtual object with the host that executes the virtual object, and displays a virtual object representation of at least one of the virtual objects, a host representation of its respective host, and an indicator representing the association between the virtual object and its respective host on a display.

16 Claims, 7 Drawing Sheets

(56) References Cited

U.S. PATENT DOCUMENTS

| | | | |
|---|---|---|---|
| 2014/0280884 A1* | 9/2014 | Searle | H04L 43/0864 709/224 |
| 2014/0351396 A1* | 11/2014 | Stabile | H04L 41/044 709/223 |
| 2014/0365531 A1* | 12/2014 | Soundararajan | G06F 17/30587 707/798 |
| 2016/0283257 A1* | 9/2016 | Antony | G06F 9/45533 |

* cited by examiner

| Virutal View | | Physical View | |
|---|---|---|---|
| | | | 308b |
| 306 VM Name | VM1 | Processing Host Name | Blade-1 |
| vSwitch Name | vSwitch 1 | Switch Host Name | Port-1 |
| DataStore | Datastore1 | Storage Host Name | Storage_Volume-1 |
| | | | |
| VM Name | VM2 | Processing Host Name | Blade-2 |
| vSwitch Name | vSwtich 2 | Switch Host Name | Port-2 |
| DataStore | Datastore 2 | Storage Host Name | Storage_Volume-2 |
| | | | |
| 306 VM Name | VM3 | Processing Host Name | Blade-3 |
| vSwitch Name | vSwitch 2 | Switch Host Name | Port-3 |
| DataStore | Datastore 3 | Storage Host Name | Storage_Volume-3 |
| | | | |
| 306 VM Name | VM4 | Processing Host Name | Blade-4 |
| vSwitch Name | vSwitch 4 | Switch Host Name | Port-4 |
| DataStore | Datastore 4 | Storage Host Name | Storage_Volume-4 |

FIG. 3B

SYSTEM AND METHOD FOR GENERATING CONVERGED VIEWS OF A VIRTUAL COMPUTING ENVIRONMENT

TECHNICAL FIELD

Aspects of the present disclosure relate to computing devices and, in particular, to a system and method for generating converged views of a virtual computing environment.

BACKGROUND

Computing resources used by enterprises, such as corporations and universities, are often provided by data centers that utilize multiple hosts that function in a collaborative manner to meet the computing resource needs of the enterprise. Early data center designs were very complex and difficult to maintain due to various reasons. To remedy these problems, converged infrastructures were introduced that provided a standardized package of components that were combined into a single, optimized computing solution. Converged infrastructures commonly used today are implemented with a virtual computing environment that includes a structured combination of multiple virtual objects that are executed on independently functioning hosts. In many cases, the quantity of these virtual objects implemented on converged infrastructures can be quite large. For example, a typical converged infrastructure may include up to 3,000 hosts executing over 30,000 objects.

SUMMARY

According to one aspect of the present disclosure, a converged infrastructure management system includes a processing system and a memory for storing an operations management application, which is executed by the processing system to obtain physical configuration information associated with one or more physical hosts of a virtual computing environment, and virtual object information associated with a plurality of virtual objects executed on the hosts. Using this information, the application generates an association for each virtual object, the association associating the virtual object with the host that executes the virtual object, and displays a virtual object representation of at least one of the virtual objects, a host representation of its respective host, and an indicator representing the association between the virtual object and its respective host on a display.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope

FIGS. 3A and 3B illustrate example displays that may be generated by the operations management application according to one embodiment of the present disclosure.

DETAILED DESCRIPTION

Aspects of an operations management system for a virtual computing environment described herein provide operations management of converged infrastructures, such as computer clusters, computing grids, and other converged infrastructures, using a data structure in which virtual objects of the converged infrastructure are each uniquely associated with a host (physical computing platform) on which they are executed. The operations management system also provides for display of all or a portion of the virtual objects of the converged infrastructure along with physical hosts on which each virtual object is executed and a visual indicator showing the association between each virtual object and its associated host.

Figure 1A:
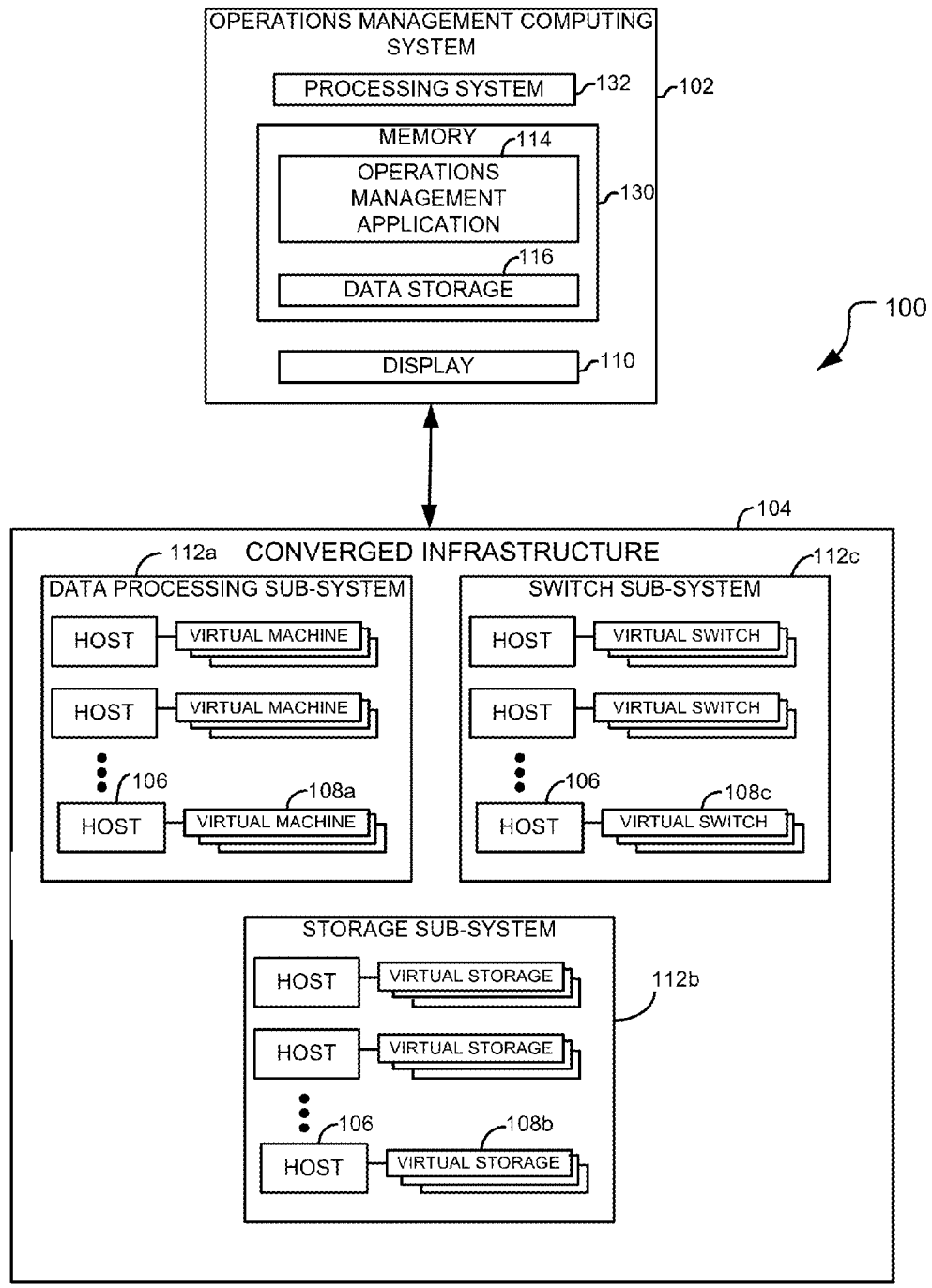
FIGS. 1A through 1C illustrate an example operations management system according to one embodiment of the present disclosure.
Figure 1B:
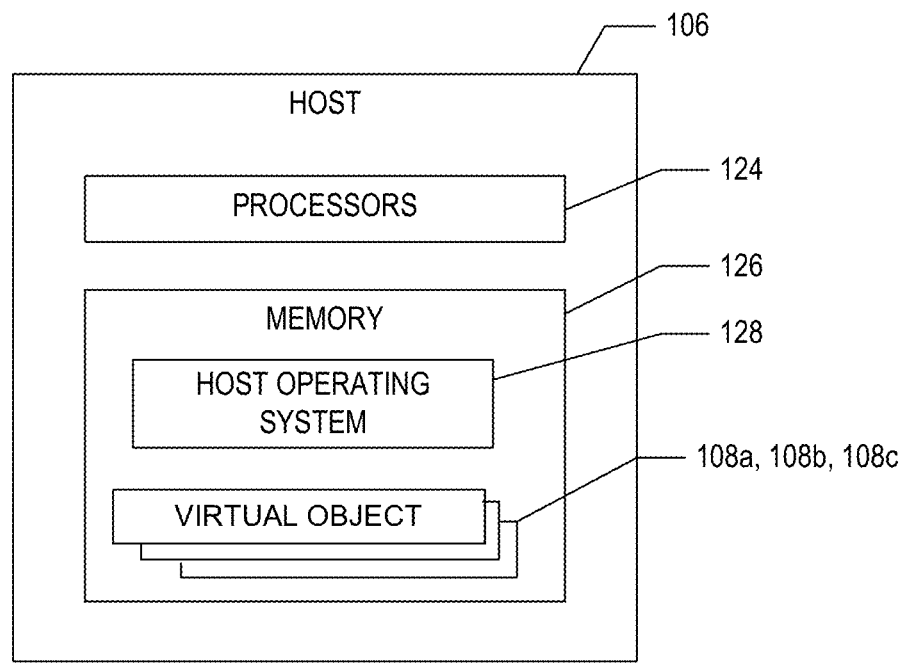
Figure 1C:
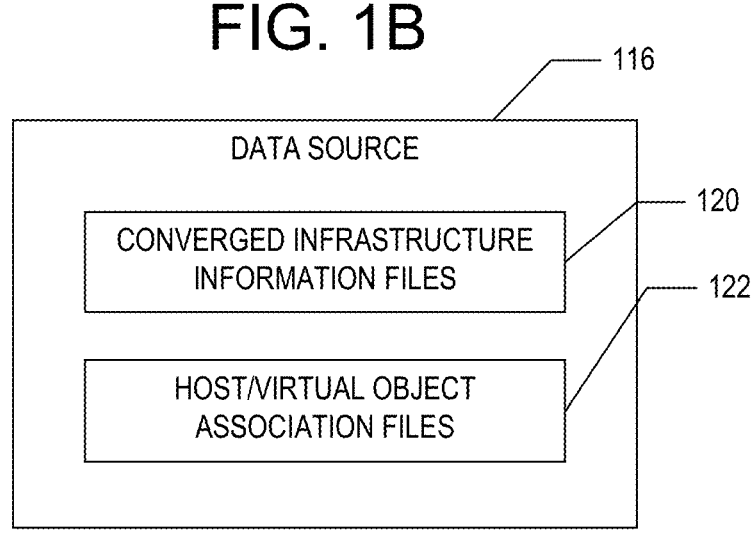

FIGS. 1A through 1C illustrate an example operations management system 100 according to the teachings of the present disclosure. The system 100 includes an operations management computing system 102 that communicates with one or more converged infrastructures 104 to monitor and control their operation. As shown, a converged infrastructure 104 includes multiple hosts 106 that each executes one or more virtual objects, which in this particular example, are virtual machines (VMs) 108a, virtual storage objects 108b, and virtual switch objects 108c. As will be described in detail below, the system 100 obtains physical configuration information associated with each host 106, and virtual object information associated with each virtual object and generates an association between each virtual object and its respective host 106 for display on a display 110.

Forming an association between each virtual object and its host on which it is executed may provide certain benefits not heretofore recognized by conventional operations management systems. For example, converged infrastructures currently in use today typically operate with more than 3,000 hosts that may each execute up to 10 or more virtual objects, thus benefiting from an operations management system that is capable of managing over 30,000 virtual objects in an organized, consistent manner. In many cases, the complexity associated with managing this relatively large number of virtual objects is further exacerbated by newer virtual machine management features that allow certain virtual objects to be automatically migrated from one host to another. Nevertheless, conventional implementations of operations management systems do not provide an efficient technique of associating virtual objects with the physical hosts on which they are executed. Embodiments of the present disclosure provides a solution to this problem, among others, with an operations management system that generates associations between each virtual object and the host on which it is executed and provides for display of these associations in a manner that enhances the visualization of the converged infrastructure for more efficient management of these virtual objects in a virtual computing environment.

The converged infrastructure 104 may be any type having multiple hosts 106 that each executes one or more virtual objects (e.g., virtual machines 108a, virtual storage objects 108b, and virtual switch objects 108c). The hosts of a converged infrastructure are often referred to as compute servers. In this disclosure, the term host may be interpreted as any physical device and/or component of the converged infrastructure. The particular converged infrastructure 104 as shown includes several sub-systems, such as a data processing sub-system 112a, a data storage sub-system 112b, and a switch sub-system 112c. Nevertheless, it should be understood that other converged infrastructures 104 may include additional, fewer, or different types of sub-systems without departing from the spirit and scope of the present disclosure. In one aspect, each converged infrastructure 104 includes a combination of these sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 104 such as that shown includes components found in VBLOCK™ System infrastructure packages available from VCE, LLC, which is headquartered in Richardson, Tex.

In one aspect, the data storage sub-system 112b includes computer-readable memory structures for storing data used by the converged infrastructure 104, which may include network attached storage (NAS) arrays and/or storage area network (SAN) arrays that are facilitated by multiple virtual objects (e.g., virtual storage objects 108b). The switch sub-system 112c provides for communication among the various sub-systems of the converged infrastructure 104, and may include components, such as fabric interconnect systems, Ethernet switches/routers, multilayer director switches (MDSs), and the like. The data processing sub-system 112a executes applications that access, store, and otherwise manipulate data stored by the converged infrastructure 104. For a particular example, either of the data storage sub-system 112b, the switch subsystem 112c, and/or the data processing sub-system 112a may comprise a blade computing platform having multiple hosts (e.g., blade computing devices) 106 that each executes one or more virtual objects.

The virtual objects of each sub-system often require active, continual management to ensure their optimal performance. Nevertheless, optimal performance of the virtual objects are often dictated by the hosts on which they are executed. For example, certain hosts 106 of each sub-system 112 may have capabilities that differ from one another. Additionally, load sharing among the hosts 106 of each sub-system 112 may require that certain virtual objects be migrated from certain hosts to other hosts as needs of the converged infrastructure 104 change over time. Thus, certain embodiments of the present disclosure may provide an advantage over conventional operations management systems in that virtual objects may be associated with their respective hosts on which they are executed to provide an enhanced view of the virtual objects and their respective hosts for more efficient management of the converged infrastructure 104.

The management computing system 102 includes a processing system (FIG. 2) that executes an operations management application 114 using a data source 116 stored in a computer-readable media (FIG. 2) (e.g., volatile or non-volatile memory). The management computing system 102 also includes a display 110 for displaying hosts and virtual objects used by the converged infrastructure 104. The management computing system 102 may include any type of computing system, such as one or more management computing systems, personal computers, mobile computers and/or other mobile devices, and other hosts. The management computing system 102 may communicate with the converged infrastructure 104 via wireless and/or wired communications.

The operations management application 114 maintains information about the virtual objects executed within the converged infrastructure 104 and stores this information in one or more converged infrastructure information files 120 in the data source 116. The operations management application 114 displays this information for view by a user on the display 110, and may also control one or more aspects of the virtual objects executed by the converged infrastructure 104. Any suitable type of operations management application 114 may be implemented with the teachings of the present disclosure. In one embodiment, the operations management application 114 is a VCENTER™ operations management tool available from VMWARE, INC™, which is headquartered in Palo Alto, Calif.

The operations management computing system 102 and the converged infrastructure 104 communicate with one another in any suitable manner. For example, the management computing system 102 and the converged infrastructure 104 communicate with each other using wireless and/or wired communications. In one embodiment, the operations management computing system 102 and the converged infrastructure 104 communicates with one another using a communication network, such as the Internet, an intranet, or another wired and/or wireless communication network. In another embodiment, the management computing system 102 and converged infrastructure 104 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the operations management computing system 102 and converged infrastructure 104 may communicate with one another without the use of a separate and a distinct network. Additionally, other embodiments contemplate that the modules employed by the operations management application 114 are executed by a computing device configured on the converged infrastructure 104.

FIG. 1B depicts an example host 106 according to one aspect of the operations management system 100. The host 106 is a computing or processing device that includes one or more processors 124 and a memory 126. For example, the host 106 can be a personal computer, such as a laptop or notebook computer, a workstation, or other processing device such as a personal digital assistant or a tablet computer. In a particular embodiment, the host 106 is a rack mounted host, such as blade host in which multiple blade hosts share a common backplane for communication with one another and for receiving power from a rack mounted power distribution unit. The memory 126 stores a host operating system 128 and one or more virtual objects (e.g., VMs 108a, virtual storage objects 108b, and virtual switch objects 108c) that are executed by the processor 124. The host operating system 128 controls and manages the operation of the virtual objects executed on the host 106. For example, control signaling for starting, stopping, and/or changing operating parameters of each virtual object is managed through the host operating system 128.

The data source 116 stores converged infrastructure information files 120 that includes information associated with virtual objects and hosts 106 of the converged infrastructure 104. The data source 116 also stores virtual object/host association files 122 that stores association information about the virtual objects and the hosts 106 on which they are executed. Nevertheless, the data source 116 stores any suitable type of information for management and display of the converged infrastructure 104. Although the data source 116 is shown as being located on, at, or within the management computing system 102, it is contemplated that the data source 116 can be located remotely from the management computing system 102, such as on, at, or within a memory 126 of one of the hosts 106, or an external database managed by the converged infrastructure 104.

Figure 2:
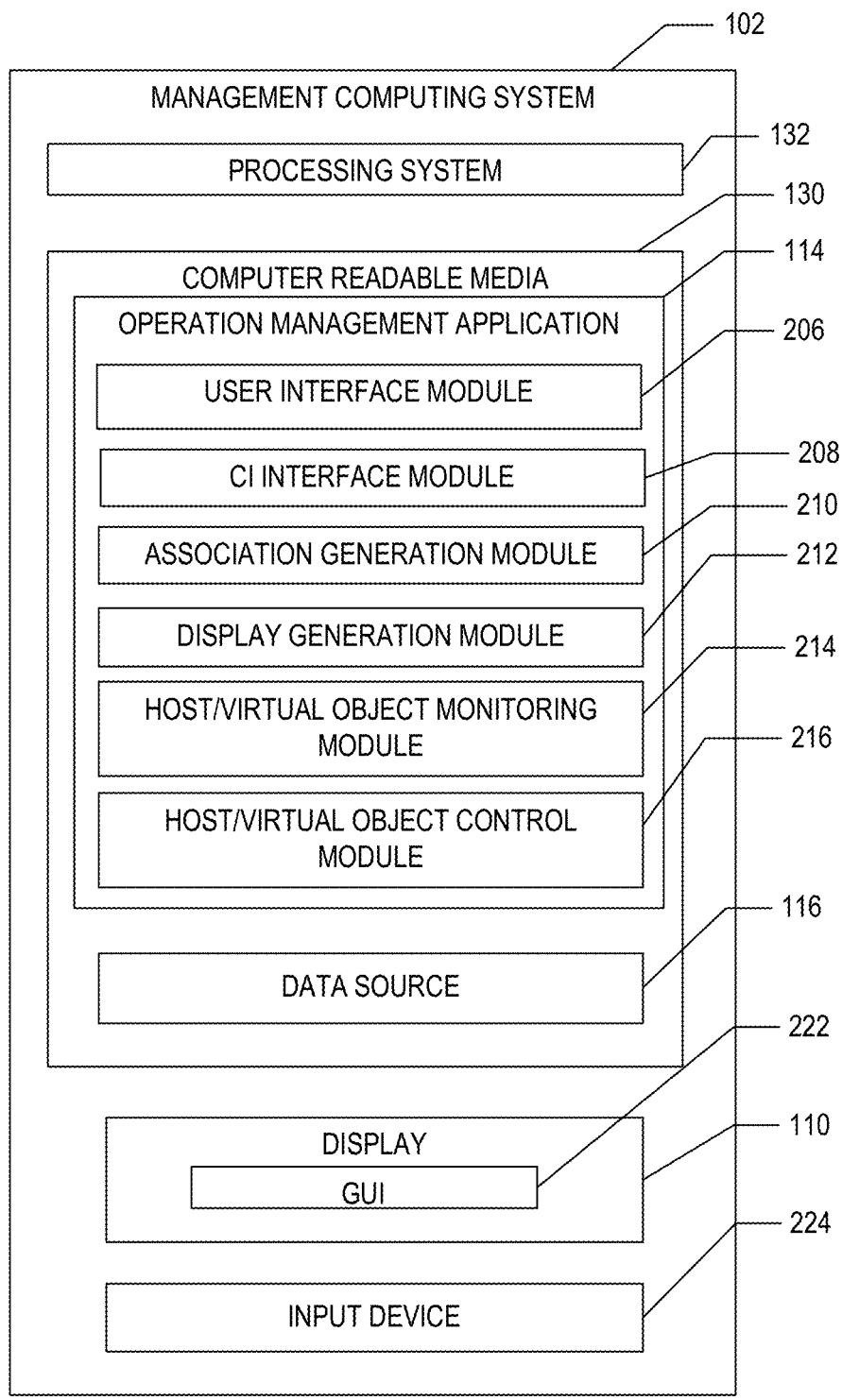
FIG. 2 is a block diagram depicting an example operations management application executed on the operations management computing system according to one embodiment of the present disclosure.

Referring now in more detail to FIG. 2, a block diagram of an example operations management application 114 executed on the management computing system 102, is depicted according to one aspect of the present disclosure.

Generally, the operations management application 114 receives physical configuration information associated with multiple hosts 106 of a converged infrastructure 104, and virtual object information associated with virtual objects executing on the converged infrastructure 104, and generates an association between each virtual object and its respective host 106, which may then be displayed on a display 110 for view by a user. The application 114 may use these associations to provide enhanced visibility into the operation of the converged infrastructure 104 by displaying only those virtual objects that are executed on certain hosts 106, and/or organizing the view provided to the user by aggregating the display of virtual objects according to the sub-systems 112 on which they are executed. The application 114 may also use these associations to provide enhanced control over the virtual objects of the converged infrastructure 104 by enabling concise control over those virtual objects that are associated with certain hosts 106.

The operations management application 114 is stored in a memory 130 (i.e., computer readable media) and executed on a processing system 132 of the management computing system 102. According to one aspect, the operations management computing system 102 also includes a graphical user interface (GUI) 222 displayed on the display 110, such as a computer monitor, for displaying data. The operations management computing system 102 also includes an input device 224, such as a keyboard or a pointing device (e.g., a mouse, trackball, pen, or touch screen) to enter data into or interact with the GUI 222. According to one aspect, the operations management application 114 includes instructions or modules that are executable by the processing system 202 as will be described in detail herein below.

The computer readable medium 130 includes volatile media, nonvolatile media, removable media, non-removable media, and/or another available medium. By way of example and not limitation, non-transitory computer readable medium 130 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 206 facilitates the receipt of input data and/or output data from or to a user, respectively. In one example, the user interface module 206 displays a representation of each virtual object 108, a representation of each host 106, and an indicator representing an association between each virtual object and the host 106 that executes the virtual object. In another example, the user interface 206 may also receive user input for manipulating or otherwise modifying the operation of the virtual object representations or host representation displayed on the display 110. The user interface module 206 also displays one or more selectable fields, editing screens, and the like for receiving the management information from the user.

A converged infrastructure (CI) interface module 208 provides an interface for communicating with the converged infrastructure 104. For example, the converged infrastructure 104 may expose one or more APIs for each of its hosts 106 that may be accessed by the converged infrastructure interface module 208 for receiving information about the host 106 and any virtual objects executed thereon, and/or for transmitting control information to the hosts 106. The converged infrastructure interface module 208 also receives status information from the converged infrastructure 104 for monitoring various operational aspects, such as configuration, operational status, system alarm conditions, and the like.

An association generation module 210 generates an association between each virtual object 108 and the host 106 on which it is executed and stores this information in the host/virtual object association files 122. The association generation module 210 may obtain this information in any suitable manner. In one embodiment, the association generation module 210 obtains the association information by querying the hosts 106 and/or virtual objects 108 of the converged infrastructure 104. In another embodiment, the host/virtual object association module 210 obtains the association information from by querying another monitoring application external to the system 100 that acquires and stores information associated with the hosts and virtual objects of the converged infrastructure 104.

A display generation module 212 displays representations of each virtual object 108 and representations of each host 106 that executes the virtual objects 108 along with indicators representing the associations between the virtual objects 108 and the hosts 106 that were generated by the association generation module 210. For example, the display generation module 212 may display a graphical representation of a host 106 in the form of a first geometric shape that includes the name of that particular host 106, and a representation of a virtual object in the form of a second geometric shape that includes the name of that particular virtual object 108, and an indicator in the form of a line extending from the first geometric shape to the second geometric shape to indicate that the virtual object 108 is executed on the host 106 represented by the first geometric shape. The geometrical shapes may have any form, such as boxes, rectangles, circles, triangles, pentagon, hexagons, and the like. As another example, the display generation module 212 may display a table including multiple rows in which each row represents an association of each virtual object executed by its respective host in the converged infrastructure 104.

A host/virtual object monitoring module 214 monitors the condition of each virtual object 108 and host 106 in the system and updates information associated with each host 106 and virtual object 108 as their conditions change. For example, the host/virtual object monitoring module 214 may receive a message from the converged infrastructure 104 indicating that one particular virtual object 108 has been stopped, or has been migrated from execution on one host 106 to execution on another host 106. In this case, the host/virtual object monitoring module 214 updates the converged infrastructure information file 120 with this new information and communicates with the host/virtual object association module 208 to update the association information associated with this virtual object 108 such that the converged infrastructure information file 120 and host/virtual object association files 122 accurately represent the current state of the hosts 106 and virtual objects in the system. As another example, the host/virtual object monitoring module 214 may include a discovery process that queries each host 106 and virtual object 108 in the converged infrastructure 104 to obtain and process up-to-date information about the current state of the converged infrastructure 104. As yet another example, the host/virtual object monitoring module 214 may receive alarm messages generated by either a host 106 or a virtual object 108 and associate the alarm message with their corresponding virtual object 108 or host 106 according to the association information stored in the host/virtual object association files 120. Using this example, the application 114 may receive an alarm message indicating that a particular host 106 is operating close to or at an overloaded condition. In this case, the host/virtual object monitoring module 214 may access the host/virtual object association files 120 to determine which virtual objects are executed on that host 106 and communicate with the display generation module 212 to display alarms along with each of these virtual objects so that a user may easily identify these virtual objects that are causing the overloaded condition and take corrective measures.

A host/virtual object control module 216 controls the operation of each host 106 and virtual object 108 on the converged infrastructure 104 using the converged infrastructure interface module 208. In one embodiment, the host/virtual object control module 216 supports command grouping such that a single command may be issued from the application 114 that may be applied to all virtual objects executed on one or more certain hosts 106. For example, a particular host 106 in the switch sub-system 112 may include two communication ports that operate in redundant fashion relative to one another. Nevertheless, during the course of operation it is determined that all communications from the virtual objects 108 executed on the host 106 should be moved from a first communication port to its redundant second communication port. In this particular case, a single command may be received that is processed by the host/virtual object control module 216 to access host/virtual object association information associated with that host 106 and issue individual commands to each virtual object 108 that is associated with that host 106.

It should be appreciated that the modules described herein are provided only as examples, and that the application 114 may have different modules, additional modules, or fewer modules than those described herein. For example, one or more modules as described in FIG. 2 may be combined into a single module. As another example, certain modules described herein may be encoded on, and executed on other computing systems, such as on one of the hosts 106 of the converged infrastructure 104.

Figure 3A:
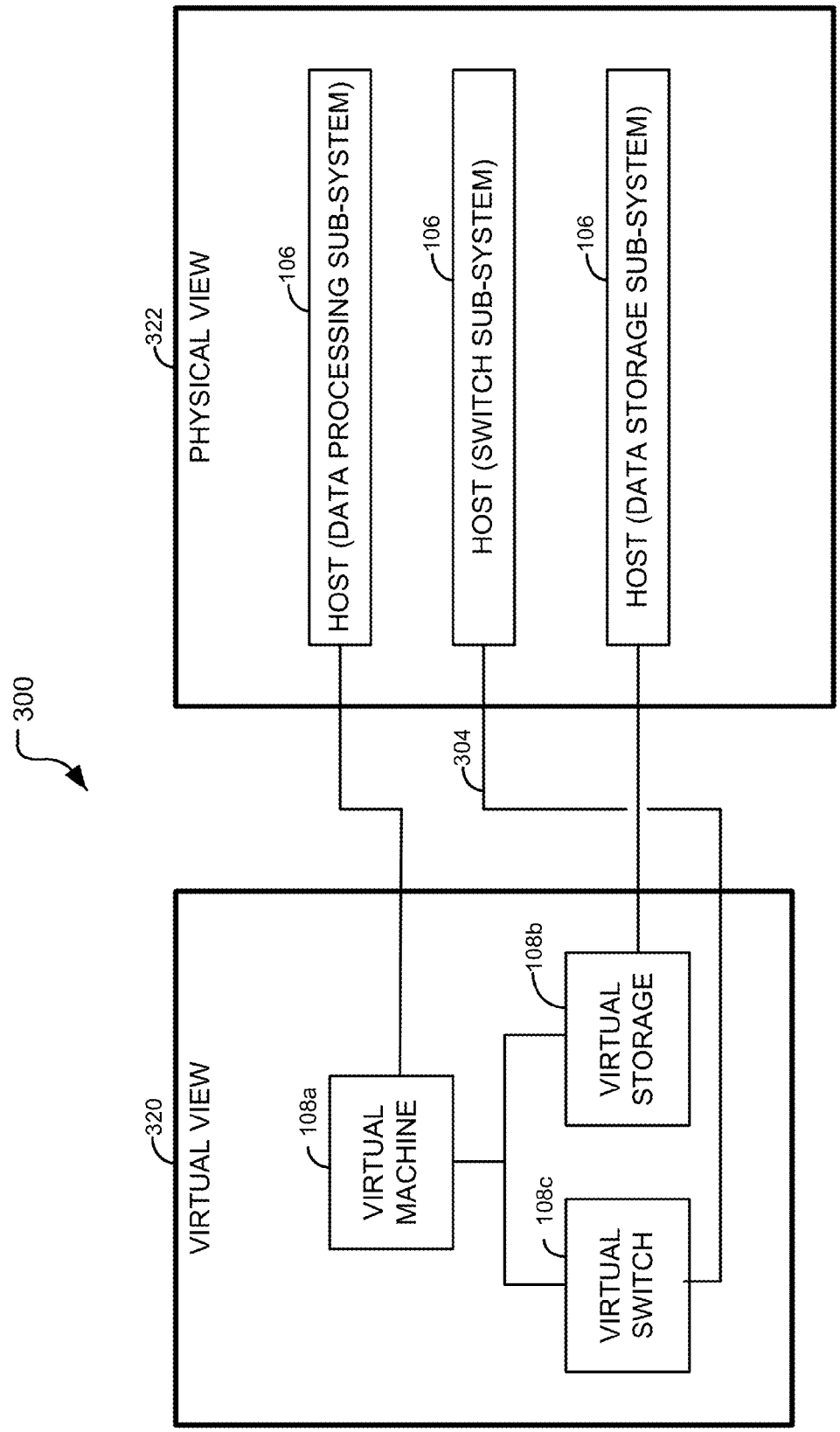

FIGS. 3A and 3B illustrate example displays that may be generated by the operations management application 114 according to embodiments of the present disclosure. In general, FIG. 3A illustrates an example graphical display 300 that may be generated by the application 114, while FIG. 3B illustrates an example table display 302 that may be generated by the application 114.

Referring initially to FIG. 3A, a graphical display 300 is provided in which virtual objects 108 are displayed in a virtual view 320 and hosts 106 of the converged infrastructure 104 are shown in a physical view 322. The virtual objects 108 and hosts 106 of the converged infrastructure 104 are represented by boxes with identifying information of each virtual object 108 and host 106 displayed inside each box. Although the virtual objects and hosts are represented herein as boxes, it should be understood that the graphical representation of virtual objects and hosts may have any geometric shape, such as circles, ovals, triangles, and the like, and may also include other graphical representations, such as icons, images, monikers, and the like. The application 114 also displays indicators 304 representing the associations between the virtual objects and the hosts 106 that execute these virtual objects, which in this particular embodiment, are lines 304 extending between the virtual objects 108 and the host 106 that executes the virtual object 108. Again, although the indicators 304 between the virtual objects and hosts 106 are shown as lines, it should be understood any visual representation may be used that indicates which host 106 is executing which virtual object 108. For example, the associations may include dashed lines, curved lines, or even shaded regions that encompass both each host 106 and the virtual objects 108 executed by that host 106.

Referring now to FIG. 3B, a table display 302 is provided in which virtual objects 108 and their respective hosts 106 are displayed on rows 306 of a table in which each row 306 represents an indicator that associates one virtual object 108 in the converged infrastructure 104 with its respective host 106. The table includes multiple columns in which a first column 308a indicates an identity of the virtual object 108, and a second column 308b indicating the identity of the physical host 106 that executes the virtual object 108 of its respective row 306. In this particular example table, the virtual objects 108 are shown in groups 310 in which each group includes a VM 108a from the data processing sub-system 112a, a virtual storage object 108b from the data storage sub-system 112b, and a virtual switch object 108c from the switch sub-system 112c. Nevertheless, it should be understood that the virtual objects may be grouped in any suitable manner within the table without departing from the spirit or scope of the present disclosure.

Although FIGS. 3A and 3B illustrate example views that may be generated by the application 114, it should be understood that other types and numbers of views may be displayed by the system 100. For example, the table view may display virtual objects 108 and their respective hosts 106 arranged in columns, while their identifying information is shown in the rows of the table. Additionally, whereas the graphical display 300 shows a virtual view and a physical view that are separated from one another, it is contemplated that other embodiments may have virtual views and physical view that are overlaid on one another when displayed on the display 110.

Figure 4:
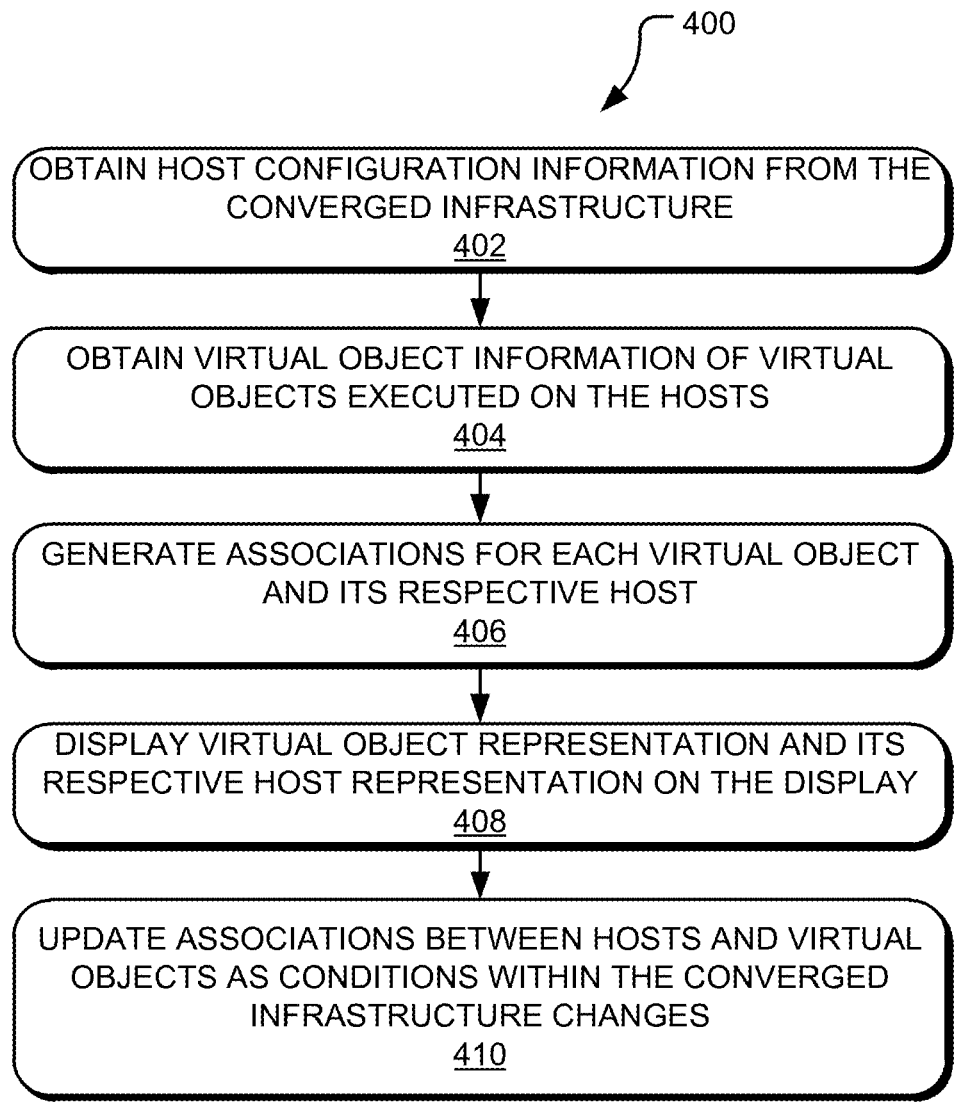
FIG. 4 illustrates an example process that is performed by the operations management application to manage operation of one or more converged infrastructures according to one embodiment of the present disclosure.

FIG. 4 illustrates an example process 400 that is performed by the operations management application 114 to manage and display virtual objects and their associated hosts 106 of a converged infrastructure 104 according to one embodiment of the present disclosure. Additionally, an example function named "Converged View" is shown herein below that may be used to generate associations between the virtual objects and their associated hosts. The example function shown below is written in the "C" programming language and is structured in a manner to be integrated into the operation of an operations management application, such as the VCENTER™ operations management tool. Nevertheless, it should be understood that other functions or combination of computer readable instructions written according to any suitable programming language may be implemented without departing from the spirit or scope of the present disclosure.

```
Function ConvergedView( )
{
    // Get physical host information
    physicalView = getPhysicalView(VblockId);
    // Get virtual object information
    vCenterId = ParsePhysical(PhysicalView, vCenter);
    virtualView = getVirtualView(VcenterId);
    // Converge and correlated views
    // Parse virtual object information
    virtual objectInfo = ParseVirtual(virtualView, virtual object);
    VirtualSwitch = ParseVirtual(virtualView, Switch);
    Datastore = ParseVirtual(virtualView, Datastore);
    // Parse physical host information
    VblockCompute= ParsePhysical(physicalView, VblockCompute);
    VblockNetwork= PasePhysical(physicalView, VblockNetwork);
    VblockStorage= ParsePhysical(physicalView, VblockStorage);
    // Map and correlate physical host information and virtual object
    information
    MapView(virtual objectInfo, VblockCompute);
    MapView(VirtualSwitch, VblockNetwork);
    MapView(Datastore, VblockStorage);
    // Present view on display
    PresentConvergedView(physicalView, virtualView);
}
```

In step 402, the application 114 obtains configuration information associated with the hosts 106 configured in the subject converged infrastructure 104. For example, the "converged View" function includes a "getPhysicalView" instruction that receives host information from a converged infrastructure 104, which in this particular example is named "VblockId." That is, the "getPhysicalView" instruction queries the converged infrastructure 104 such that the converged infrastructure 104 transmits host information back to the application 114 in response to the request.

In step 404, the application 114 obtains virtual object information associated with virtual objects 108 executed on the converged infrastructure 104. The application 114 may obtain the virtual object information in any suitable manner. In one embodiment, the application 114 obtains the virtual object information in response to a query for host information as described above with reference to step 402. For example, the "converged View" function includes a "parsePhysical" instruction that parses the received host information, and a "getVirtualView" instruction that extracts virtual object information from the parsed host information. In other embodiments, the application 114 may obtain the virtual object information from other sources, such as issuing a query to the converged infrastructure 104 to obtain the virtual object information directly from the converged infrastructure 104.

In one embodiment, the application 114 may further organize the obtained host information and virtual object information according to a sub-system 112 in which they are operated. For example, the "converged View" function includes a "parseVirtual" instruction that aggregates virtual object information according to a sub-system (i.e., data processing sub-system 112a, data storage sub-system 112b, and/or switch sub-system 112c) in which they operate, and a "parsePhysical" instruction that aggregates host information according to the sub-system (i.e., data processing sub-system, data storage sub-system, and/or switch sub-system) in which the hosts operate. Nevertheless, the "parseVirtual" and "parsePhysical" instructions may be omitted if aggregation according to each sub-system is not needed or desired.

In step 406, the application 114 generates an association for each virtual object 108 and its respective host. That is, the application 114 identifies, for each virtual object 108, the host 106 that executes that particular virtual object 108 and generates an association between the two. For example, the "converged View" function includes a "mapView" instruction that, for each sub-system 112 in the converged infrastructure 104, generates an association for each virtual object 108 using parsed virtual object information generated in step 404.

In one embodiment, the generated association information may be stored in the host/virtual object association files 122 for use by other operations of the application 114. For example, the application 114 may correlate features or characteristics of the host 106 with a virtual object 108 executed on that host as the virtual object 108 is displayed on the display. Using this example, when a virtual object 108 is displayed on the display 110, characteristics of the host, such as processor type, a size and type of memory, or other physical features of the physical host may be displayed along with the virtual object 108 so that the user may be provided with an enhanced view of the physical aspects of the virtual object 108. Additionally, the application 114 may receive real-time messages, such as alarm messages, associated with a host 106 and associate those messages with virtual objects 108 executed on that host 106 so that users may quickly determine which virtual objects 108 are directly affected by the content of the messages.

In step 408, the application 114 displays a virtual object representation, a host representation, and an indicator (e.g., a line 304 (FIG. 3A) or a row 306 (FIG. 3B)) representing the association between the virtual object 108 and the host 106 on the display 110 for view by the user. Any type of indicator may be used to correlate the virtual object 108 to its respective host. For example, the indicator for each virtual object 108 may be a row 306 of a table (FIG. 3B) that displays some or all of the virtual objects executed on the converged infrastructure 104. As another example, the indicator may be a line 304 (FIG. 3A) that extends from the virtual object representation to the host representation on the display 110. As yet another example, the indicator may be a delineated region of the display 110 (e.g., a box or other container) that encompasses the virtual object 108 and its associated host.

In step 410, the application 114 continually monitors the converged infrastructure 104 and updates the associations between the hosts 106 and virtual objects 108 as conditions within the converged infrastructure 104 changes. For example, the application 114 may modify the association of a virtual object 108 in response to receipt of a message from the converged infrastructure 104 indicating that the subject virtual object has been migrated from one host 106 to another host 106. As another example, the application 144, upon receipt of a message from the converged infrastructure 104 indicating that an alarm condition exists in a particular host 106, access the host/virtual object association files 122 to determine which virtual objects 108 are executed on that host 106, and display that alarm information along with display of those virtual objects 108 associated with the alarmed host 106 so that a user may easily determine which virtual objects are affected by the alarm condition of the host 106.

The steps described above may be repeated to generate additional views of the converged infrastructure 104, or for generating converged views of other converged infrastructures 104 in the system 100. Nevertheless, when displaying converged views of converged infrastructures 104 is no longer needed or desired, the process ends.

Although FIG. 4 describes one example of a process that may be performed by the application 114 for generating converged views of virtual objects and their associated hosts, the features of the disclosed process may be embodied in other specific forms without deviating from the spirit and scope of the present disclosure. For example, the application 114 may perform additional, fewer, or different operations than those operations as described in the present example. As another example, the steps of the process described herein may be performed by a system other than the application 114, which may be, for example, one of the virtual objects executed on the converged infrastructure 104.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
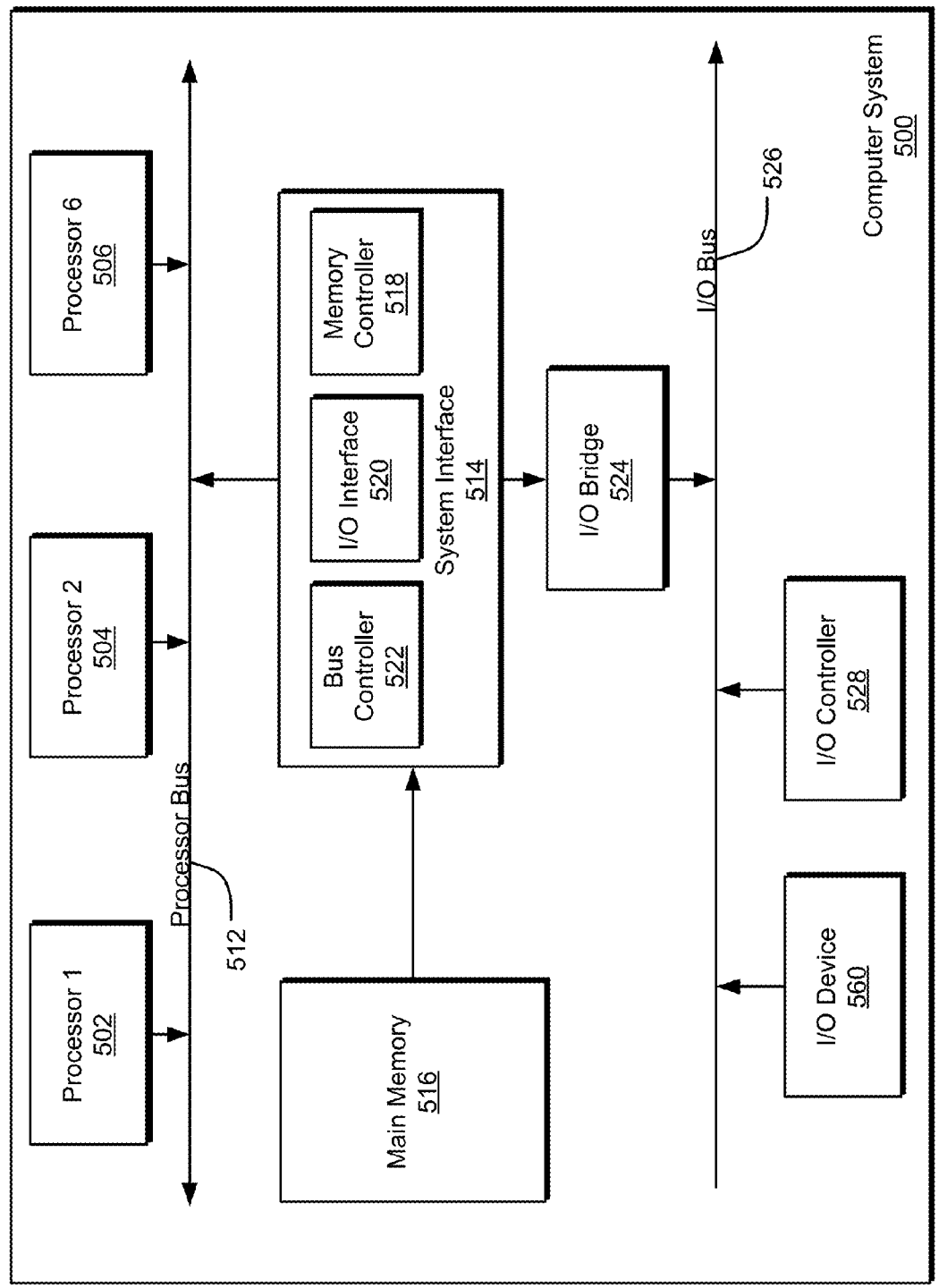
FIG. 5 is a block diagram illustrating an example of a computing device or computer system which may be used in implementing the embodiments of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. An operations management system comprising:
   an operations management computing system comprising at least one processor and at least one memory to store instructions that are executed by the at least one processor to:
   obtain physical configuration information associated with a plurality of physical hosts of a virtual computing environment;
   obtain virtual object information associated with one or more virtual objects executed on each of the plurality of physical hosts;
   obtain a plurality of associations between the virtual objects and the plurality of physical hosts that execute the virtual objects;
   for one of the plurality of physical hosts, display a virtual object representation of two or more of the virtual objects executed on the one physical host, a physical host representation of the one physical host, and an indicator representing an association between the two or more virtual objects and the one physical host on a display;
   receive a single configuration command associated with the one physical host of the plurality of physical hosts;
   using the obtained plurality of associations, identify the two or more virtual objects that are executed by the one physical host of the plurality of physical hosts; and
   issue a virtual object specific configuration command to each of the identified two or more virtual objects in response to the single configuration command,
   wherein the indicator comprises a displayed object that associates a first geometric shape comprising the virtual object representation with a second geometric shape comprising the physical host representation.

2. The operations management system of claim 1, wherein the instructions are executable to display the indicator as a line between the virtual object representation and the physical host representation.

3. The operations management system of claim 1, wherein the virtual object representations and the physical host representations comprise a plurality of columns of a table on the display, and the indicator comprises a row of the table.

4. The operations management system of claim 1, wherein the instructions are executable to associate a message related to the one physical host with one of the virtual objects executed by the one physical host.

5. The operations management system of claim 1, wherein the instructions are executable to aggregate the one or more virtual objects and the plurality of hosts according to one or more sub-systems of the virtual computing environment, and wherein the one or more sub-systems comprise at least one of a data processing sub-system, data storage sub-system, and a switch sub-system.

6. The operations management system of claim 1, wherein the instructions are executable to receive a message indicating that one of the virtual objects has been migrated to another physical host, and modify the association to associate the one virtual object with the other physical host.

7. A method comprising:
   obtaining, using instructions stored on a non-transitory computer-readable medium and executed on at least one processor, physical configuration information associated with a plurality of physical hosts of a virtual computing environment;
   obtaining, using the instructions executed by the at least one processor, virtual object information associated with one or more virtual objects executed on each of the plurality of physical hosts;
   obtaining, using the instructions executed on the at least one processor, a plurality of associations between the virtual objects and the plurality of physical hosts that execute the virtual objects;
   for one of the plurality of physical hosts, displaying, using the instructions executed on the at least one processor, a virtual object representation of two or more of the virtual objects executed on the one physical host, a physical host representation of the one physical host, and an indicator representing an association between the two or more virtual objects and the one physical host on a display;
   receiving, using the instructions executed on the at least one processor, a single configuration command associated with the one physical host of the plurality of physical hosts;
   using the obtained plurality of associations, identifying, using the instructions executed on the at least one processor, the two or more virtual objects that are executed by the one physical host of the plurality of physical hosts; and
   issuing, using the instructions executed on the at least one processor, a virtual object specific configuration command to each of the identified two or more virtual objects in response to the single configuration command,
   wherein the indicator comprises a displayed object that associates a first geometric shape comprising the virtual object representation with a second geometric shape comprising the physical host representation.

8. The method of claim 7, further comprising displaying the indicator as a line between the virtual object representation and the physical host representation.

9. The method of claim 7, wherein the virtual object representations and the physical host representations comprise a plurality of columns of a table on the display, and the indicator comprising a row of the table.

10. The method of claim 7, further comprising associating a message related to the one physical host with one of the virtual objects executed by the one physical host.

11. The method of claim 7, further comprising receiving a message indicating that one of the virtual objects has been migrated to another physical host, and modify the association to associate the one virtual object with the other physical host.

12. A in a non-transitory, computer readable medium that includes computer instructions that when executed by at least one processor, is operable to perform at least the following:
    obtaining physical configuration information associated with a plurality of physical hosts of a virtual computing environment;
    obtaining virtual object information associated with one or more virtual objects executed on each of the plurality of physical hosts;
    obtaining a plurality of associations between the virtual objects and the plurality of physical hosts that execute the virtual objects;
    for one of the plurality of physical hosts, displaying a virtual object representation of two or more of the virtual objects executed on the one physical host, a physical host representation of the one physical host, and an indicator representing an association between the two or more virtual objects and the one physical host on a display;
    receiving a single configuration command associated with the one physical host of the plurality of physical hosts;
    using the obtained plurality of associations, identifying the two or more virtual objects that are executed by the one physical host of the plurality of physical hosts; and
    issuing a virtual object specific configuration command to each of the identified two or more virtual objects in response to the single configuration command,
    wherein the indicator comprises a displayed object that associates a first geometric shape comprising the virtual object representation with a second geometric shape comprising the physical host representation.

13. The non-transitory computer readable medium of claim 12, the computer instructions further operable to perform displaying the indicator as a line between the virtual object representation and the physical host representation.

14. The non-transitory computer readable medium of claim 12, wherein the virtual object representations and the physical host representations comprise a plurality of columns of a table on the display, and the indicator comprising a row of the table.

15. The non-transitory computer readable medium of claim 12, the computer executable instructions further operable to perform associating a message related to the one physical host with one of the virtual objects executed by the one physical host.

16. The non-transitory computer readable medium of claim 12, the computer executable instructions further operable to perform receiving a message indicating that one of the virtual objects has been migrated to another physical host, and modify the association to associate the one virtual object with the other physical host.

* * * * *